US011511270B2

(12) United States Patent
Meeuwissen et al.

(10) Patent No.: US 11,511,270 B2
(45) Date of Patent: Nov. 29, 2022

(54) PREPARATION OF A COBALT-CONTAINING CATALYST

(71) Applicant: SHELL OIL COMPANY, Houston, TX (US)

(72) Inventors: Jurjen Meeuwissen, Amsterdam (NL); Erwin Roderick Stobbe, Amsterdam (NL)

(73) Assignee: SHELL USA, INC., Houston, TX (US)

(*) Notice: Subject to any disclaimer, the term of this patent is extended or adjusted under 35 U.S.C. 154(b) by 124 days.

(21) Appl. No.: 16/982,436

(22) PCT Filed: Mar. 19, 2019

(86) PCT No.: PCT/EP2019/056828
§ 371 (c)(1),
(2) Date: Sep. 18, 2020

(87) PCT Pub. No.: WO2019/180013
PCT Pub. Date: Sep. 26, 2019

(65) Prior Publication Data
US 2021/0053045 A1 Feb. 25, 2021

(30) Foreign Application Priority Data
Mar. 20, 2018 (EP) .................................... 18162936

(51) Int. Cl.
B01J 37/03 (2006.01)
B01J 6/00 (2006.01)
B01J 23/75 (2006.01)
B01J 35/02 (2006.01)
B01J 35/10 (2006.01)
B01J 37/04 (2006.01)
B01J 37/06 (2006.01)
B01J 37/08 (2006.01)
C10G 2/00 (2006.01)

(52) U.S. Cl.
CPC ............. *B01J 37/031* (2013.01); *B01J 6/001* (2013.01); *B01J 23/75* (2013.01); *B01J 35/026* (2013.01); *B01J 35/1014* (2013.01); *B01J 37/04* (2013.01); *B01J 37/06* (2013.01); *B01J 37/08* (2013.01); *C10G 2/332* (2013.01)

(58) Field of Classification Search
CPC . B01J 37/031; B01J 37/04; B01J 37/06; B01J 37/08; B01J 6/001; B01J 23/75; B01J 35/1014; B01J 35/026; C10G 2/332
USPC .......................... 502/314, 324; 518/700, 715
See application file for complete search history.

(56) References Cited

U.S. PATENT DOCUMENTS

| 4,595,703 | A | 6/1986 | Payne et al. | |
| 6,130,184 | A * | 10/2000 | Geerlings | B01J 23/8892 502/313 |
| 6,265,452 | B1 | 7/2001 | Steynberg et al. | |
| 7,084,180 | B2 | 8/2006 | Wang et al. | |
| 8,013,025 | B2 | 9/2011 | Steynberg et al. | |
| 8,722,748 | B2 | 5/2014 | Tasaka | |
| 2003/0119668 | A1* | 6/2003 | Lok | B01J 35/002 502/332 |
| 2007/0259974 | A1* | 11/2007 | Lok | B01J 35/1061 518/715 |
| 2017/0348677 | A1* | 12/2017 | Klemt | B01J 37/06 |
| 2018/0369790 | A1* | 12/2018 | Klemt | B01J 37/0203 |

FOREIGN PATENT DOCUMENTS

| EP | 0455307 A1 | 11/1991 |
| EP | 0510771 A1 | 10/1992 |
| EP | 0510772 A1 | 10/1992 |
| EP | 2008714 A1 | 12/2008 |
| WO | 9700231 A1 | 1/1997 |
| WO | 2007069317 A1 | 6/2007 |
| WO | 2010100256 A2 | 9/2010 |
| WO | 2016097407 A1 | 6/2016 |

OTHER PUBLICATIONS

International Search Report and Written Opinion received for PCT Patent Application No. PCT/EP2019/056828, dated Jun. 24, 2019, 12 pages.
Bezemer et al., "Preparation of Fischer-tropsch Cobalt Catalysts Supported on Carbon Nanofibers and Silica Using Homogeneous Deposition-Precipitation", Journal of Catalysis, vol. 237, Issue No. 2, Jan. 25, 2006, pp. 291-302, XP024913146.
Gonzalez-Lopez et al., "Crystal Structure of Cobalt Hydroxide Carbonate Co2CO3(OH)2: Density Functional Theory and X-ray Diffraction Investigation", Acta Crystallographica. Section B:Structural Science, Crystal Engineering and Materials, vol. 73, Jan. 1, 2017, pp. 868-873, XP009507939.
Xu et al., "Dimensional Control of Cobalt-hydroxide-carbonate Nanorods and Their Thermal Conversion to One-Dimensional Arrays of Co3O4 Nanoparticles", The Journal of Physical Chemistry B: Condensed Matter, Materials, Surfaces, Interfaces & Biophysical, vol. 107, Issue No. 46, Jan. 1, 2003, pp. 12643-12649, XP009507942.

* cited by examiner

*Primary Examiner* — Patricia L. Hailey
(74) *Attorney, Agent, or Firm* — Shell USA, Inc.

(57) ABSTRACT

The present invention is directed to the preparation of a cobalt containing catalyst, a precipitate as an intermediate product, a Fischer-Tropsch catalyst and a process for producing normally gaseous, normally liquid and optionally normally solid hydrocarbons from synthesis gas. The precipitate and catalyst comprise crystalline Co(OH)(CO3)0.5, the crystals are needle shaped and have a surface area of at least 80 m²/g dry precipitate.

10 Claims, No Drawings

PREPARATION OF A COBALT-CONTAINING CATALYST

CROSS REFERENCE TO EARLIER APPLICATION

The present application is the National Stage (§ 371) of International Application No. PCT/EP2019/056828, filed Mar. 19, 2019, which claims priority from European Application 18162936.1, filed Mar. 20, 2018, incorporated herein by reference.

FIELD OF THE INVENTION

The present invention is directed to the preparation of a cobalt containing catalyst, a precipitate as an intermediate product, a Fischer-Tropsch catalyst and a process for producing normally gaseous, normally liquid and optionally normally solid hydrocarbons from synthesis gas.

BACKGROUND TO THE INVENTION

Many documents are known describing processes for the catalytic conversion of (gaseous) hydrocarbonaceous feedstocks, especially methane, natural gas and/or associated gas, into liquid products, especially methanol and liquid hydrocarbons, particularly paraffinic hydrocarbons. In this respect, often reference is made to remote locations and/or off-shore locations, where direct use of the gas, e.g. through a pipeline or in the form of liquefied natural gas, is not always practical. This holds even more in the case of relatively small gas production rates and/or fields. Reinjection of gas will add to the costs of oil production, and may, in the case of associated gas, result in undesired effects on the crude oil production. Burning of associated gas has become an undesired option in view of depletion of hydrocarbon sources and air pollution. The Fischer-Tropsch process can be used as part of the conversion of hydrocarbonaceous feed stocks into liquid and/or solid hydrocarbons. Generally the feed stock (e.g. natural gas, associates gas and/or coal-bed methane, coal) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into compounds ranging from methane to high molecular weight modules comprising up to 200 carbon atoms, or, under particular circumstances, even more, (and water).

Other examples of hydrocarbonaceous feedstocks that can be used for catalytic conversion are coal, biomass, refuse, oil residue and off gasses from refineries.

Catalysts used in the Fischer-Tropsch synthesis often comprise a carrier based support material and one or more metals from Group VIII of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

Typically, the catalysts in the prior art have been prepared by impregnation of a porous carrier with one or more soluble cobalt salts and a quantity of a solvent, followed by drying, calcination and optionally activation. In the case of pore impregnation of a porous carrier, it will usually be possible to start with a mechanical strong extrudate. However, the maximum cobalt loading that can be obtained by a single impregnation step is restricted by the pore volume of the carrier and the solubility of the cobalt salt. In practice, several impregnation steps are needed to obtain the desired quantity of cobalt. The need for such a number of steps is undesirable for the preparation of catalysts on a commercial scale.

It has been described in the prior art that suitable Fischer-Tropsch catalyst also may be prepared by mulling or kneading alumina (EP 0 455 307), silica (EP 0 510 771) or zirconia (EP 0 510 772) with a soluble or insoluble cobalt source. In that way, a paste may be obtained which is extruded, dried and calcined in order to get a catalyst or catalyst precursor which may be used in the Fischer-Tropsch reaction. Especially in the case of using an insoluble cobalt source, a sufficiently high loading of cobalt may be obtained with a relatively simple process, suitable for use on a commercial scale.

One catalyst for Fischer-Tropsch reactions is by mulling or kneading a soluble or insoluble cobalt source with titania. In one way to prepare the catalyst, cobalt hydroxide (Co(OH)2) can be used as a starting material.

The composite material of cobalt hydroxide and titania is shaped by extrusion and subsequently dried and calcined and then placed in a Fischer-Tropsch reactor. In the reactor, the cobalt oxide is reduced to cobalt.

There is an ongoing need in the field of Fischer-Tropsch catalysts for improved catalyst having a good activity while also having a good $C_{5+}$ selectivity.

SUMMARY OF THE INVENTION

It is an aim of the present invention to provide for a Fischer-Tropsch catalyst with an improved activity.

It has surprisingly been found that the process for the preparation of a cobalt-containing catalyst or catalyst precursor, a precipitate comprising a carrier material and a Fischer-Tropsch catalyst or precursor thereof comprising a carrier material, according to the present invention meet this object. I an aspect of the invention the process comprises the steps of:
(a) mixing:
  (1) water;
  (2) a first aqueous solution comprising carbonate ions;
  (3) a second aqueous solution comprising cobalt ions and optionally ions of at least one promoter metal compound, selected from the group consisting of manganese, vanadium, rhenium, ruthenium, zirconium, titanium or chromium; to form a mixture;
(b) obtaining from the mixture obtained in step (a) a precipitate; wherein the pH of the mixture of step (a) during mixing is maintained within the range of 6.5 to 8.5 and the temperature of the water, first and second aqueous solution and the mixture obtained in step (a) is maintained within the range of 50 and 85 degrees Celsius.

In an aspect of the invention the precipitate comprises crystalline Co(OH)(CO3)0.5. In an aspect of the invention the Fischer-Tropsch catalyst or Fischer-Tropsch catalyst precursor comprises a carrier material and crystalline Co(OH)(CO3)0.5.

In an aspect of the invention the catalyst is used in a process for producing normally gaseous, normally liquid and optionally normally solid hydrocarbons from synthesis gas, said process comprises the steps of:

(i) providing the synthesis gas to a reactor comprising the catalyst; and (ii) catalytically converting the synthesis gas of step (i) at an elevated temperature and pressure to obtain the normally gaseous, normally liquid and optionally normally solid hydrocarbons.

DETAILED DESCRIPTION OF THE INVENTION

In an aspect of the invention the process comprises the steps of:
(a) mixing:
(1) water;
(2) a first aqueous solution comprising carbonate ions;
(3) a second aqueous solution comprising cobalt ions and optionally ions of at least one promoter metal compound, selected from the group consisting of manganese, vanadium, rhenium, ruthenium, zirconium, titanium or chromium;
to form a mixture;
(b) obtaining from the mixture obtained in step (a) a precipitate;
wherein the pH of the mixture of step (a) during mixing is maintained within the range of 6.5 to 8.5 and the temperature of the water, first and second aqueous solution and the mixture obtained in step (a) is maintained within the range of 50 and 85 degrees Celsius.

Optionally to (1) water, (2) a first aqueous solution comprising carbonate ions and/or (3) a second aqueous solution comprising cobalt ions and optionally ions of at least one promoter metal compound, selected from the group consisting of manganese, vanadium, rhenium, ruthenium, zirconium, titanium or chromium a surfactant is added.

Surfactants are surface active substances. Types of surfactant suitable for the present invention are anionic, cationic, zwitterionic and/or nonionic surfactants. Examples of suitable anionic surfactants for the present invention, but not limited to this list, are: sulfates, sulfonate and phopshate esters; carboxylates. An example of suitable cationic surfactants for the present invention, but not limited to this surfactant, is quaternary ammonium salts. Examples of suitable nonionic surfactants for the present invention, but not limited to this list are ethoxylates; fatty acid esters; amine oxides; sulfoxides; phosphine oxides. Examples of a suitable zwitterionic surfactant, but not limited to these surfactants are amino acids.

In an aspect of the invention the precipitate comprises crystalline $Co(OH)(CO_3)_{0.5}$ having a surface area of at least 80 m2/g.

In an aspect of the invention the Fischer-Tropsch catalyst or Fischer-Tropsch catalyst precursor comprises a carrier material and crystalline $Co(OH)(CO_3)_{0.5}$.

In an aspect of the invention the catalyst is used in a process for producing normally gaseous, normally liquid and optionally normally solid hydrocarbons from synthesis gas, said process comprises the steps of:
(i) providing the synthesis gas to a reactor comprising the catalyst; and
(ii) catalytically converting the synthesis gas of step (i) at an elevated temperature and pressure to obtain the normally gaseous, normally liquid and optionally normally solid hydrocarbons.

The inventors found that the method of the present invention provides for small needle shaped cobalt containing crystals. The crystals comprise $Co(OH)(CO_3)_{0.5}$ and have at least a surface area of at least 80 m$^2$/g. The crystal preferably have at least a surface area of at least 100 m$^2$/g. The surface area is determined with BET surface area measurements. The small crystals together with high surface area allow for a good distribution of the crystals in a catalyst. Further the high surface area provides for a high surface area for contact of the reactants and the catalytically active phase. This results in a higher activity of the catalyst compared to the prior art catalysts.

In an aspect of the invention the second aqueous solution comprising cobalt ions further contains ions of at least one promoter metal compound, selected from the group consisting of manganese, vanadium, rhenium, ruthenium, zirconium, titanium or chromium.

In an aspect of the invention the first aqueous solution comprises carbonate and hydroxide ions. In an aspect of the invention the carbonate and hydroxide ions are present in a 1:1 ratio.

In an aspect of the invention the second aqueous solution further comprises one or more of the following anions: chloride, bromide, iodide, chlorate, perchlorate, nitrate, nitrite, sulfate or any other anion of which a cobalt salt is soluble in water.

In an aspect of the invention the process, in step (a), the first and second aqueous solutions are admixed to the water. The inventors found that this allows for good pH control during mixing.

Ph range of precipitation needs to be controlled between 6.5-8.5 to minimize solubility of Co salts. Outside the preferred pH range soluble Co salts are remain in the supernatant and are not used economically.

In an aspect of the invention the process further comprising the step of:
(c) co-mulling of a carrier material and the precipitate to obtain a co-mulled material, wherein prior to the co-mulling the precipitate is washed. The co-mulled material can be used as a Fischer-Tropsch catalyst in slurry reactors. Examples of these reactors are disclosed in WO2007069317, U.S. Pat. Nos. 8,722,748, 8,013,025 and 6,265,452. The co-mulled product can also be used as a catalyst in microchannel reactors such as disclosed in U.S. Pat. No. 7,084,180.

In an aspect of the invention the process further comprises the step of:
(d) shaping and drying of the co-mulled material obtained in step (c) to obtain a shaped material.

Optionally the co-mulled material is shaped without drying or the co-mulled material is further used without shaping and drying.

Typically, the ingredients of the mixture are mulled for a period of from 5 to 120 minutes, preferably from 15 to 90 minutes. During the mulling process, energy is put into the mixture by the mulling apparatus. The mulling process may be carried out over a broad range of temperature, preferably from 15 to 90° C. As a result of the energy input into the mixture during the mulling process, there will be a rise in temperature of the mixture during mulling. The mulling process is conveniently carried out at ambient pressure. Any suitable, commercially available mulling machine may be employed.

To improve the flow properties of the mixture, it is preferred to include one or more flow improving agents and/or extrusion aids in the mixture prior to extrusion. Suitable additives for inclusion in the mixture include fatty amines, quaternary ammonium compounds, polyvinyl pyridine, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc.

To obtain strong extrudates, it is preferred to include in the mixture, prior to extrusion, at least one compound which acts as a peptising agent for the titania. Suitable peptising agents for inclusion in the extrudable mixture are well known in the art and include basic and acidic compounds. Examples of basic compounds are ammonia, ammonia-releasing compounds, ammonium compounds or organic amines. Such basic compounds are removed upon calcination and are not retained in the extrudates to impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included in the mixture, prior to extrusion, in order to create macropores in the resulting extrudates. Suitable burn-out materials are commonly known in the art.

In an aspect of the invention shaping is effected by extrusion of the co-mulled material. Extrusion may be effected using any conventional, commercially available extruder. In particular, a screw-type extruding machine may be used to force the mixture through the orifices in a suitable die-plate to yield extrudates of the desired form. The strands formed upon extrusion may be cut to the desired length.

In an aspect of the invention the process further comprises the step of calcining or drying of the shaped material obtained in step (d). Calcination is effected at elevated temperature, preferably at a temperature between 400 and 750° C., more preferably between 500 and 650° C. The duration of the calcination treatment is typically from 5 minutes to several hours, preferably from 15 minutes to 4 hours. Suitably, the calcination treatment is carried out in an oxygen-containing atmosphere, preferably air. It will be appreciated that, optionally, the drying step and the calcining step can be combined.

One or more aspects of the invention relating to the process can be combined.

The method of the present invention provides as an intermediate product a precipitate. Said precipitate comprises crystalline Co (OH)(CO3)0.5 H$_2$O and is an aspect of the invention.

In an aspect of the invention the precipitate further comprises $X(OH)(CO_3)_{0.5}$ wherein X is selected from the group consisting of manganese, vanadium, rhenium, ruthenium, zirconium, titanium or chromium, wherein the crystals are needle shaped and have a surface area of at least 80 m$^2$/g dry precipitate.

In an aspect of the invention the precipitate consists of $Co(OH)(CO_3)_{0.5}$ and $X(OH)(CO_3)_{0.5}$ wherein X is selected from the group consisting of manganese, vanadium, rhenium, ruthenium, zirconium, titanium, platinum or chromium, wherein the crystals are needle shaped and have a surface area of at least 80 m$^2$/g dry precipitate. Preferably, the mol ratio of $Co(OH)(CO_3)_{0.5}$ to $X(OH)(CO_3)_{0.5}$ is at least 10:1.

In an aspect of the invention the precipitate is obtainable by the process according to the invention. Preferably the precipitate is obtained by the process according to the invention.

One or more aspects of the invention relating to the precipitate can be combined.

In an aspect of the invention a Fischer-Tropsch catalyst or Fischer-Tropsch catalyst precursor comprises a carrier material and crystalline $Co(OH)(CO_3)_{0.5}$. The crystalline $Co(OH)(CO_3)_{0.5}$ is referred to as the active phase in the present invention.

The term "a Fischer-Tropsch catalyst or Fischer-Tropsch catalyst precursor" as used herein typically refers to an active phase material, or a precursor thereof, with an inert carrier, such as a refractory oxide, present typically as nano-sized particles. The active phase material or precursor thereof may be a catalytically active metal or precursor thereof.

The Fischer-Tropsch catalyst or Fischer-Tropsch catalyst precursor may, for example, be extrudates, pellets, or one or more particles comprising catalyst material on a support. Substrates for supporting Fischer-Tropsch catalyst or Fischer-Tropsch catalyst precursor can be one or more of a number of materials, which are known in the art. These include metals such as steel, preferably stainless steel. Others include ceramics and combinations thereof.

In an aspect of the invention the Fischer-Tropsch catalyst comprises as a carrier material, a refractory metal oxide or precursor thereof.

In an aspect of the invention the catalyst further comprises crystalline $X(OH)(CO_3)_{0.5}$ wherein X is selected from the group consisting of manganese, vanadium, rhenium, ruthenium, zirconium, titanium, platinum or chromium, wherein the crystals are needle shaped and have a surface area of at least 80 m$^2$/g dry precipitate.

In an aspect of the invention the catalyst is an extrudated particle comprising the crystalline $Co(OH)(CO_3)_{0.5}$ and preferably crystalline $X(OH)(CO_3)_{0.5}$ as defined above. The extrudated particles can be used in fixed bed reactors.

One or more aspects of the invention relating to the Fischer-Tropsch catalyst can be combined.

In an aspect of the invention the catalyst is used in a process for producing normally gaseous, normally liquid and optionally normally solid hydrocarbons from synthesis gas. Said process comprises the steps of:

(i) providing the synthesis gas to a reactor comprising the catalyst; and (ii) catalytically converting the synthesis gas of step (i) at an elevated temperature and pressure to obtain the normally gaseous, normally liquid and optionally normally solid hydrocarbons.

For the present description normally gaseous, normally liquid and normally solid hydrocarbons means the state the respective hydrocarbons are in at ambient conditions (20° C. and 1 bar).

Fischer-Tropsch synthesis is preferably carried out at a temperature in the range from 125-150 to 350° C., more preferably 175 to 275° C., most preferably 180 to 270° C. The pressure preferably ranges from 1-5 to 150-200 bar abs., more preferably from 10 to 70 bar abs. Preferably, a Fischer-Tropsch catalyst is used, which yields substantial quantities of paraffins, more preferably substantially unbranched paraffins. A part may boil above the boiling point range of the so-called middle distillates, to normally solid hydrocarbons. A most suitable catalyst for this purpose is a cobalt-containing Fischer-Tropsch catalyst. The term "middle distillates", as used herein, is a reference to hydrocarbon mixtures of which the boiling point range corresponds substantially to that of kerosene and gas oil fractions obtained in a conventional atmospheric distillation of crude mineral oil. The boiling point range of middle distillates generally lies within the range of about 150 to about 360° C. The higher boiling range paraffinic hydrocarbons if present, may be isolated and subjected to a catalytic hydrocracking step, which is known per se in the art, to yield the desired middle distillates. The catalytic hydrocracking is carried out by contacting the paraffinic hydrocarbons at elevated temperature and pressure and in the presence of hydrogen with a catalyst containing one or more metals having hydrogenation activity, and supported on a carrier. Suitable hydrocracking catalysts include catalysts comprising metals selected from Groups VIB and VIII of the (same) Periodic Table of Elements. Preferably, the hydrocracking catalysts contain one or more noble metals from Group VIII. Preferred noble metals are platinum, palladium, rhodium, ruthenium, iridium, and osmium. Most preferred catalysts for use in the hydrocracking stage are those comprising platinum.

The amount of catalytically active metal present in the hydrocracking catalyst may vary within wide limits and is typically in the range of from about 0.05 to about 5 parts by weight per 100 parts by weight of the carrier material. Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The process may be operated in a single pass mode ("once through") or in a recycle mode. Slurry bed reactors, ebulliating bed reactors and fixed bed reactors may be used, the fixed bed reactor being the preferred option.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired.

The off gas of the hydrocarbon synthesis may comprise normally gaseous hydrocarbons produced in the synthesis process, nitrogen, unconverted methane and other feedstock hydrocarbons, unconverted carbon monoxide, carbon dioxide, hydrogen and water. The normally gaseous hydrocarbons are suitably C 1-5 hydrocarbons, preferably C1-4 hydrocarbons, more preferably C1-3 hydrocarbons. These hydrocarbons, or mixtures thereof, are gaseous at temperatures of 5-30° C. (1 bar), especially at 20° C. (1 bar). Further, oxygenated compounds, e.g. methanol, dimethyl ether, may be present in the off gas. The off gas may be utilized for the production of electrical power, in an expanding/combustion process such as in a gas turbine described herein, or recycled to the process. The energy generated in the process may be used for own use or for export to local customers. Part of an energy could be used for the compression of the oxygen containing gas. The process as just described may be combined with all possible embodiments as described in this specification.

Steam generated by any start-up gas turbine and/or steam generated in step (i) may also be used to preheat the reactor to be used in step (ii) and/or may be used to create fluidization in the case that a fluidized bed reactor or slurry bubble column is used in step (ii).

Any percentage mentioned in this description is calculated on total weight or volume of the composition, unless indicated differently. When not mentioned, percentages are considered to be weight percentages. Pressures are indicated in bar absolute, unless indicated differently.

One or more of the aspects of the invention may be combined. The appended claims form an integral part of the description by way of this reference. The present disclosure is not limited to the embodiments as described above and the appended claims. Many modifications are conceivable and features of respective embodiments may be combined.

What is claimed is:

1. A process for the preparation of a cobalt-containing catalyst or catalyst precursor, comprising:
   (a) mixing:
      (1) water;
      (2) a first aqueous solution comprising carbonate and hydroxide ions;
      (3) a second aqueous solution comprising cobalt ions and ions of at least one promoter metal compound, selected from the group consisting of manganese, vanadium, rhenium, ruthenium, zirconium, titanium or chromium;
   to form a mixture;
   (b) obtaining from the mixture obtained in step (a) a precipitate consisting of needle shaped crystalline $Co(OH)(CO_3)_{0.5}$ and $X(OH)(CO_3)_{0.5}\ H_2O$ wherein X is selected from the group consisting of manganese, vanadium, rhenium, ruthenium, zirconium, titanium or chromium, the precipitate having a surface area of at least 80 $m^2/g$;
   wherein the pH of the mixture of step (a) during mixing is maintained within the range of 6.5 to 8.5 and the temperature of the water, first and second aqueous solution and the mixture obtained in step (a) is maintained within the range of 50 and 85 degrees Celsius; and
   (c) co-mulling of a carrier material and the precipitate to obtain a co-mulled material wherein prior to the co-mulling the precipitate is washed.

2. The process according to claim 1, wherein in step (a) the first and second aqueous solutions are admixed to the water.

3. The process according to claim 1, further comprising the step of:
   (d) shaping and drying of the co-mulled material obtained in step (c) to obtain a shaped material.

4. The process according to claim 3, further comprising the step of calcining or drying of the shaped material obtained in step (d).

5. A Fischer-Tropsch catalyst comprising a carrier material and crystalline $Co(OH)(CO_3)_{0.5}\ H_2O$ and $X(OH)(CO_3)_{0.5}\ H_2O$ wherein X is selected from the group consisting of manganese, vanadium, rhenium, ruthenium, zirconium, titanium or chromium, wherein the crystals are needle shaped and have a surface area of at least 80 $m^2/g$ dry precipitate.

6. The Fischer-Tropsch catalyst according to claim 5 wherein the carrier material is a refractory metal oxide or precursor thereof.

7. A process for producing normally gaseous, normally liquid and optionally normally solid hydrocarbons at ambient conditions of 20° C. and 1 bar from synthesis gas which process comprises the steps of:
   (i) providing the synthesis gas to a reactor comprising the catalyst; and
   (ii) utilizing a Fischer-Tropsch catalyst of claim 6, catalytically converting the synthesis gas of step (1) at temperature in the range from 125 to 350° C. and pressure from 1 to 200 bara to obtain the normally gaseous, normally liquid and optionally normally solid hydrocarbons.

8. A process for producing normally gaseous, normally liquid and optionally normally solid hydrocarbons at ambient conditions of 20° C. and 1 bar from synthesis gas which process comprises the steps of:
   (i) providing the synthesis gas to a reactor comprising the catalyst; and
   (ii) utilizing a Fischer-Tropsch catalyst of claim 7, catalytically converting the synthesis gas of step (i) at temperature in the range from 125 to 350° C. and pressure from 1 to 200 bara to obtain the normally gaseous, normally liquid and optionally normally solid hydrocarbons.

9. A precipitate consisting of crystalline $Co(OH)(CO_3)_{0.5}$ and $X(OH)(CO_3)_{0.5}$ $H_2O$ wherein X is selected from the group consisting of manganese, vanadium, rhenium, ruthenium, zirconium, titanium or chromium, wherein the crystals are needle shaped and have a surface area of at least 80 $m^2$/g dry precipitate.

10. A Fischer-Tropsch catalyst precursor comprising a carrier material and crystalline $Co(OH)(CO_3)_{0.5}$ $H_2O$ and $X(OH)(CO_3)_{0.5}$ $H_2O$ wherein X is selected from the group consisting of manganese, vanadium, rhenium, ruthenium, zirconium, titanium or chromium, wherein the crystals are needle shaped and have a surface area of at least 80 $m^2$/g dry precipitate.

* * * * *